United States Patent
Warford et al.

(10) Patent No.: US 8,078,464 B2
(45) Date of Patent: Dec. 13, 2011

(54) METHOD AND SYSTEM FOR ANALYZING SEPARATED VOICE DATA OF A TELEPHONIC COMMUNICATION TO DETERMINE THE GENDER OF THE COMMUNICANT

(75) Inventors: Roger Warford, Hoschton, GA (US); Chris Thoman, Austin, TX (US)

(73) Assignee: Mattersight Corporation, Lake Forest, IL (US)

( * ) Notice: Subject to any disclaimer, the term of this patent is extended or adjusted under 35 U.S.C. 154(b) by 872 days.

(21) Appl. No.: 12/079,721

(22) Filed: Mar. 28, 2008

(65) Prior Publication Data

US 2008/0262844 A1 Oct. 23, 2008

Related U.S. Application Data (60) Provisional application No. 60/921,061, filed on Mar. 30, 2007.

(51) Int. Cl.
*G10L 15/00* (2006.01)
(52) U.S. Cl. ............... 704/246; 704/254; 369/27.01
(58) Field of Classification Search .............. 704/246, 704/254; 369/27.01
See application file for complete search history.

(56) References Cited

U.S. PATENT DOCUMENTS

| | | | |
|---|---|---|---|
| 5,953,701 A * | 9/1999 | Neti et al. | 704/254 |
| 7,295,970 B1 * | 11/2007 | Gorin et al. | 704/221 |
| 2003/0110038 A1 * | 6/2003 | Sharma et al. | 704/270 |
| 2004/0030550 A1 * | 2/2004 | Liu et al. | 704/231 |
| 2005/0240424 A1 * | 10/2005 | Lin et al. | 705/1 |

FOREIGN PATENT DOCUMENTS

KR 551953 B1 * 2/2006

OTHER PUBLICATIONS

Yu-Min Zeng et al. "Robust GMM Based Gender Classification Using Pitch and Rasta-PLP Parameters of Speech", Aug. 2006.*

* cited by examiner

*Primary Examiner* — Daniel D Abebe
(74) *Attorney, Agent, or Firm* — McDermott Will & Emery LLP

(57) ABSTRACT

A method and system for determining the gender of a communicant in a communication is provided. According to the method, at least one aural segment corresponding to at least one word spoken by a communicant is identified. The aural segment is then analyzed by applying a gender detection model to the aural segment, and gender detection data is generated based on the application of the gender detection model.

10 Claims, 7 Drawing Sheets

From Aug 10, 2005
To Aug 11, 2005

Any Location, Team, Agent Search

Between Aug 10th 2005 and 11th 2005 all agents received 1470 calls of which 29% had customer dissatisfaction. These calls had the following characteristics:

Number of Calls [ ]

- ☐ 3% had previously contacted the company about this issue.
- ☐ Were [82% Inbound ▽] Calls
- ☐ Were [65% Female ▽]
- ☐ Were [63% Gold ▽] Customer Value Segment
- ☑ Were [63% Money Market ▽] Customer Value Segment.
- ☐ Had the following personalities: [All Personalities ▽]
- ☐ Were calling for [78% Themselves ▽]
- ☐ Expressed thier dissatisfaction with [38% Self-Service ▽]
- ☐ Were calling about [22% Unsolicited Trade ▽]
- ☐ [0%] had Competitor Reference [63% Fidelity ▽]
- ☐ Had [40% Moderate ▽] Dissatisfaction

[Search]

Based on these results, please select the desired criteria and the specified number of calls will be returned.

Our application is based on analyzing second by second illinguistics patterns for distress. Extensive research shows there is a high correlation between customer distress and customer dissatisfaction.

Found 1 recording between Aug 10th and Aug 11th

All CSRs

| | Id | | CSR ✓ | Call Type ✓ | Length | Call Date |
|---|---|---|---|---|---|---|
| ○ | | ✓ | | | | |
| ○ | 1399 | | James Ross | Unsolicited Trade | 9:39 | 08/10 12:20pm |

METHOD AND SYSTEM FOR ANALYZING SEPARATED VOICE DATA OF A TELEPHONIC COMMUNICATION TO DETERMINE THE GENDER OF THE COMMUNICANT

CROSS-REFERENCE TO RELATED APPLICATIONS

The present invention claims priority to U.S. Provisional Patent Application No. 60/921,061, filed Mar. 30, 2007.

TECHNICAL FIELD

The present invention relates to a method and system for analyzing voice data, and more particularly, for analyzing voice data of a telephonic communication to determine the gender of the communicant.

BACKGROUND OF THE INVENTION

It is known to utilize telephone call centers to facilitate the receipt, response and routing of incoming telephone calls relating to customer service, retention, and sales. Generally, a customer is in contact with a customer service representative ("CSR") or call center agent who is responsible for answering the customer's inquiries and/or directing the customer to the appropriate individual, department, information source, or service as required to satisfy the customer's needs. There is a need in customer relationship management ("CRM") for tools useful for automatically determining the gender of a caller.

The present invention is provided to solve the problems discussed above and other problems, and to provide advantages and aspects not previously provided. A full discussion of the features and advantages of the present invention is deferred to the following detailed description, which proceeds with reference to the accompanying drawings.

SUMMARY OF THE INVENTION

According to the present invention, a computer program for determining the gender of a communicant in a communication is provided. The computer program is embodied on a computer readable storage medium adapted to control a computer. The computer program comprises a plurality of code segments for performing the task. The computer program identifies at least one aural segment corresponding to at least one word spoken by a communicant. The aural segment is then analyzed by applying a gender detection model to the aural segment, and gender detection data is generated based on the application of the gender detection model.

According to another aspect of the present invention, the identified aural segment is decomposed into at least one frame, and the gender detection model is applied to the frame or frames.

According to yet another aspect of the present invention, the computer program generates a frequency for the aural segment. The generated frequency is then converted to frequency domain. In one embodiment, more than one aural segments is identified, and each is decomposed into a respective frame. The gender detection model is then applied to each of the respective frames.

According to still another embodiment of the present invention the gender detection data is analyzed for each of the frames, and the gender of the communicant is determined based on the analysis of the gender detection data for each of the frames.

According to another aspect of the present invention, the computer program receives a separated telephonic communication. The separated telephonic communication comprising at least one of first constituent voice data and second constituent voice data. At least a portion of either or both, or the first or second constituent voice data, is analyzed by applying a gender detection model thereto. The computer program then generates gender detection data corresponding to the analyzed portion of the first and second constituent voice data.

According to another aspect of the invention, extracting the frame level data further by decomposing the identified aural segment into at least one frame having a stationary aural signal. The decomposing generates at least one frequency. The computer program is configured to attenuate the generated frequency or frequencies. The attenuated frequency or frequencies are converted to frequency domain, and a non-linear filter is applied to the attenuated generated frequency in the frequency domain such that the non-linear filter emphasizes at least one aural frequency.

According to still another aspect of the invention, the computer program is configured to generate an aural data packet having at least one frame. The aural data packet is of sufficient length to identify psycholinguistics of the aural data packet. The aural data packet is then analyzed to generate at least one aural data packet statistic. According to one embodiment, the generated aural data packet statistic is configured to identify the gender classification of the aural data packet.

According to yet another embodiment, the computer program analyzes a plurality of the aural data packets in which each aural data packet comprises an aural data packet statistic identifying the gender classification of the respective aural data packet. The number of aural data packets corresponding to a gender classification is counted. The resulting number of aural data packets having a predetermined gender classification is compared to a predetermined threshold. The computer program then identifies the gender of the communicant based on the comparison.

According to still another embodiment of the invention, the computer program generates predictive customer behavioral data based on an analysis of at least the gender detection data.

According to another aspect of the invention, a plurality of the aural segments is identified in which each aural segment corresponds to at least one word spoken by a communicant. The identified aural segments are decomposed into a respective frame. A respective frequency is generated for each of the identified and decomposed aural segments. The respective generated frequencies are converted to frequency domain, and a weighted neural model is applied to the frames. Gender detection data is generated based on the applying of the weighted neural model.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which.

DETAILED DESCRIPTION

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIGS. 1-7, a method is provided for determining the gender of a communicant in a communication. While the present invention provides a discussion of the present method and system as it is employed in a contact center, the method has general application. Accordingly, the following description of one preferred environment in which the present invention can be used should not in any way limit the scope or use of the present method or system. Moreover, a "contact center" as used herein can include any facility or system server suitable for receiving telephonic communications, including via voice-over IP ("VoIP"), transmitted by or through telephone lines, cable, wireless communications or any other suitable means.

Figure 2:
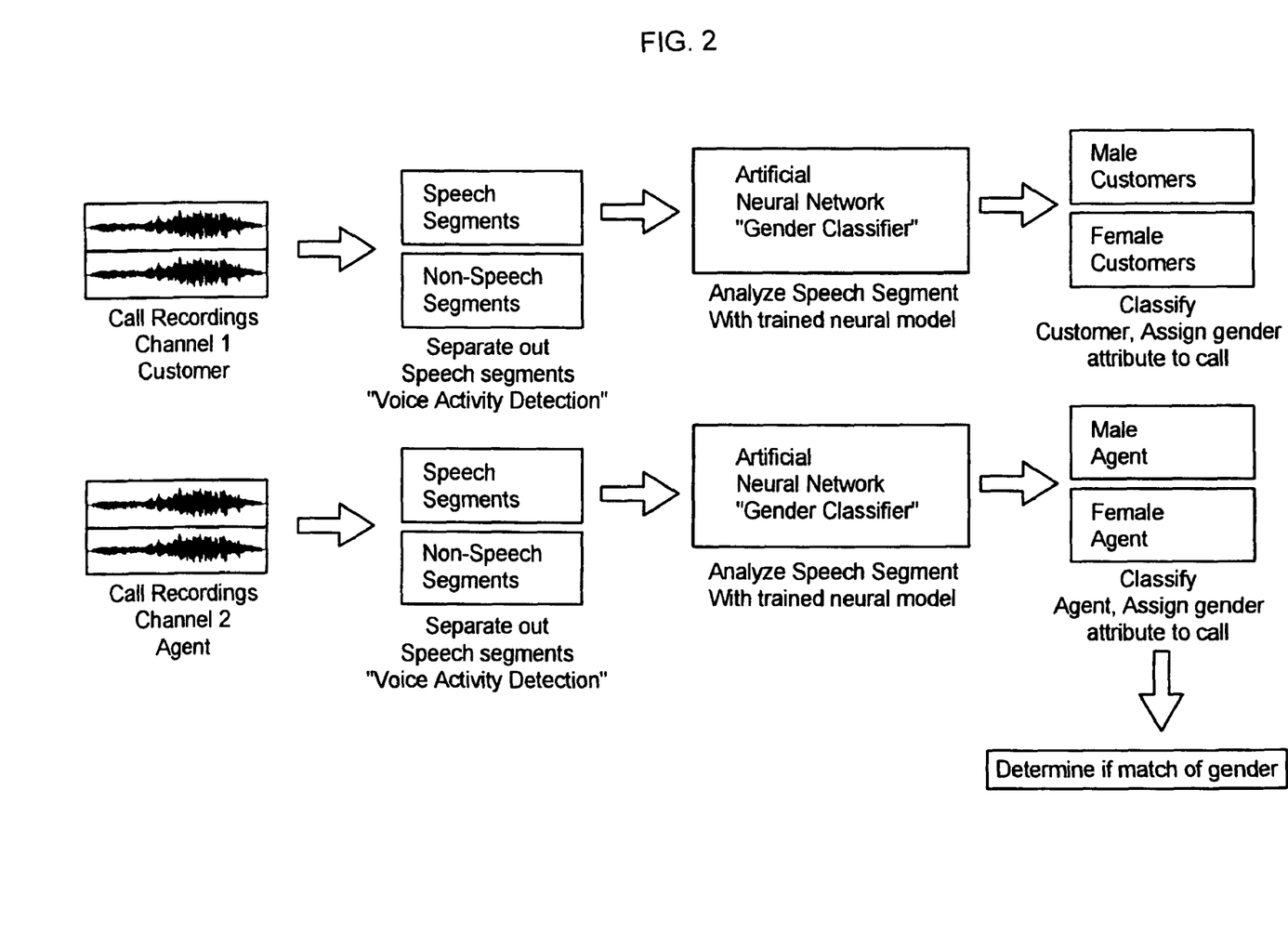
FIG. 2 is a flow chart of a method of configuring a gender detection model in accordance with to the present invention

As shown in FIG. 2, according to the method of the present invention, at least one aural segment 101 is identified. The identified aural segment 101 corresponds to at least one word spoken by a communicant. The identified aural segment 101 or segments are decomposed into at least one frame as will be described herein. The decomposition generates a respective frequency for the aural segment 101. The respective generated frequency is converted to frequency domain. A gender detection model is then applied to at least one frame of the aural segment 101, and gender detection data is generated based on application of the gender detection model to the frame 103. The gender detection data will include data that identifies the gender of the communicant 105.

It is contemplated by one embodiment of the present invention that the above described method for determining the gender of a communicant can be implemented by a computer program. Now is described in more specific terms, the computer hardware associated with operating the computer program that may be used in connection with the present invention.

Process descriptions or blocks in figures should be understood as representing modules, segments, or portions of code which include one or more executable instructions for implementing specific logical functions or steps in the process. Alternate implementations are included within the scope of the embodiments of the present invention in which functions may be executed out of order from that shown or discussed, including substantially concurrently or in reverse order, depending on the functionality involved, as would be understood by those having ordinary skill in the art.

Figure 3:
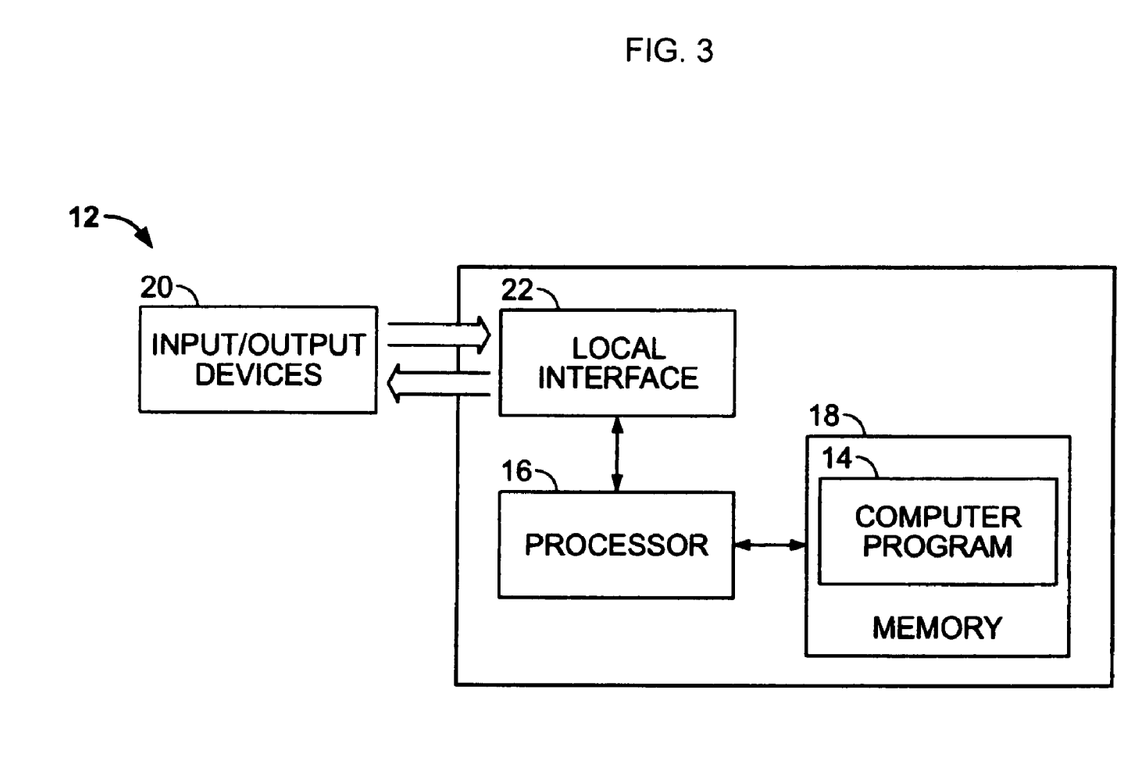
FIG. 3 is a block diagram of a telephonic communication system according to the present invention.
Figure 4:
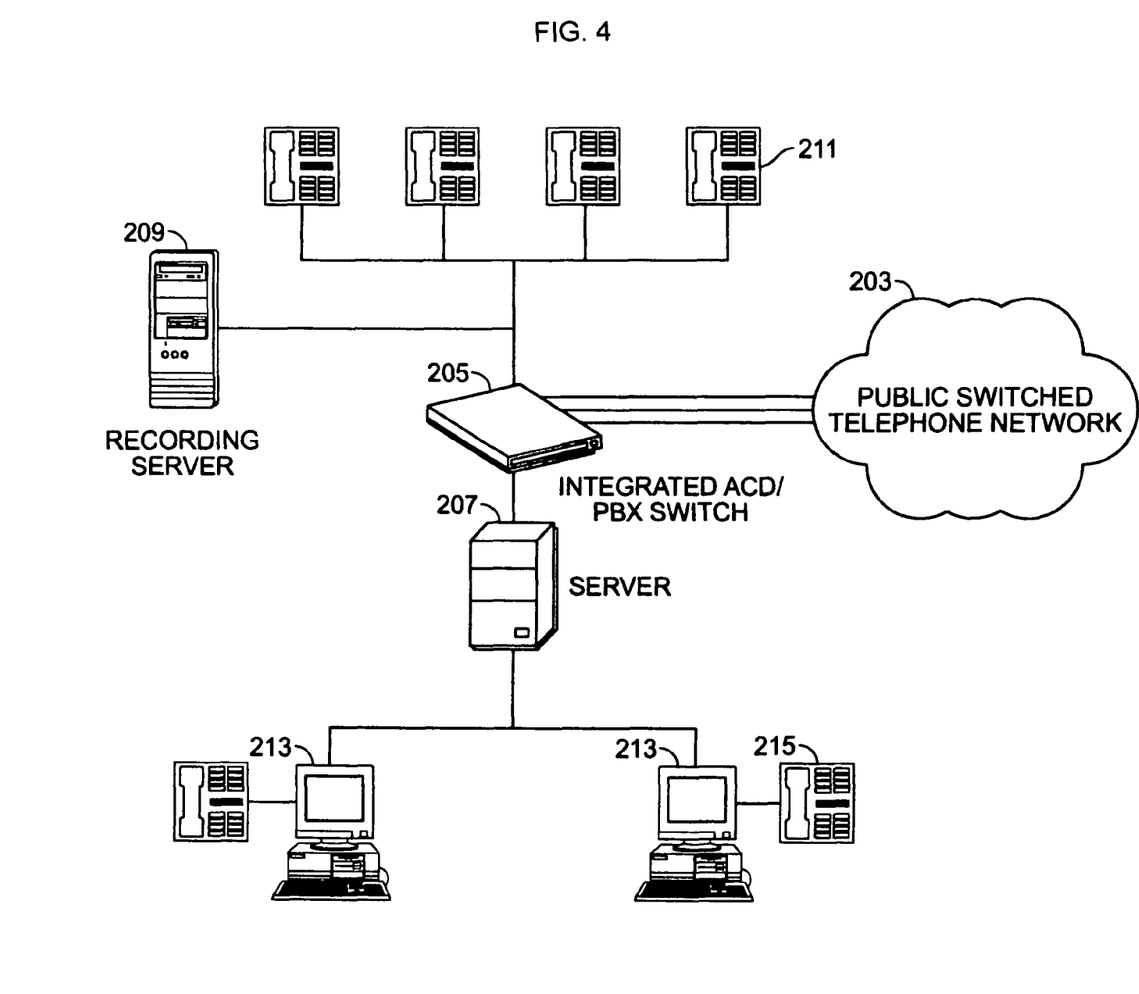
FIG. 4 is a block diagram of a telephonic communication system according to the present invention.

FIG. 3 is a block diagram of a computer or server 12. For purposes of understanding the hardware as described herein, the terms "computer" and "server" have identical meanings and are interchangeably used. Computer 12 includes control system 14. The control system 14 of the invention can be implemented in software (e.g., firmware), hardware, or a combination thereof. In the currently contemplated best mode, the control system 14 is implemented in software, as an executable program, and is executed by one or more special or general purpose digital computer(s), such as a personal computer (PC; IBM-compatible, Apple-compatible, or otherwise), personal digital assistant, workstation, minicomputer, or mainframe computer. An example of a general purpose computer that can implement the control system 14 of the present invention is shown in FIG. 3. The control system 14 may reside in, or have portions residing in, any computer such as, but not limited to, a general purpose personal computer. Therefore, computer 12 of FIG. 3 may be representative of any computer in which the control system 14 resides or partially resides.

Generally, in terms of hardware architecture, as shown in FIG. 3, the computer 12 includes a processor 16, memory 18, and one or more input and/or output (I/O) devices 20 (or peripherals) that are communicatively coupled via a local interface 22. The local interface 22 can be, for example, but not limited to, one or more buses or other wired or wireless connections, as is known in the art. The local interface 22 may have additional elements, which are omitted for simplicity, such as controllers, buffers (caches), drivers, repeaters, and receivers, to enable communications. Further, the local interface may include address, control, and/or data connections to enable appropriate communications among the other computer components.

The processor 16 is a hardware device for executing software, particularly software stored in memory 18. The processor 16 can be any custom made or commercially available processor, a central processing unit (CPU), an auxiliary processor among several processors associated with the computer 12, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80×8 or Pentium series microprocessor from Intel Corporation, a PowerPC microprocessor from IBM, a Sparc microprocessor from Sun Microsystems, Inc., an 8xxx series microprocessor from Motorola Corporation, Intel Xeon (Single and Dual Core), or Intel Xeon Processor MP (Single and Dual Core).

The memory 18 can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). Moreover, memory 18 may incorporate electronic, magnetic, optical, and/or other types of storage media. The memory 18 can have a distributed architecture where various components are situated remote from one another, but can be accessed by the processor 16.

The software in memory 18 may include one or more separate programs, each of which comprises an ordered listing of executable instructions for implementing logical functions. In the example of FIG. 3, the software in the memory 18 includes the control system 14 in accordance with the present invention and a suitable operating system (O/S) 24. A non-exhaustive list of examples of suitable commercially available operating systems 24 is as follows: (a) a Windows operating system available from Microsoft Corporation, including Microsoft Vista and Windows Mobile Client; (b) a Netware operating system available from Novell, Inc.; (c) a Macintosh operating system available from Apple Computer, Inc.; (d) a UNIX operating system, which is available for purchase from many vendors, such as the Hewlett-Packard Company, Sun Microsystems, Inc., and AT&T Corporation; (e) a LINUX operating system, which is freeware that is readily available on the Internet; (f) a run time Vxworks operating system from WindRiver Systems, Inc.; or (g) an appliance-based operating system, such as that implemented in handheld computers or personal digital assistants (PDAs) (e.g., PalmOS available from Palm Computing, Inc., and Windows CE available from Microsoft Corporation). The operating system 24 essentially controls the execution of other computer programs, such as the control system 14, and provides scheduling, input-output control, file and data management, memory management, and communication control and related services.

The control system 14 may be a source program, executable program (object code), script, or any other entity comprising a set of instructions to be performed. When a source program, the program needs to be translated via a compiler, assembler, interpreter, or the like, which may or may not be included within the memory 18, so as to operate properly in connection with the O/S 24. Furthermore, the control system 14 can be written as (a) an object oriented programming language, which has classes of data and methods, or (b) a procedure programming language, which has routines, subroutines, and/or functions, for example but not limited to, C, C++, C# (C Sharp), PHP, Pascal, Basic, Fortran, Cobol, Perl, Java, and Ada. In one embodiment, the control system 14 is written in C#. The I/O devices 20 may include input devices, for example but not limited to, a keyboard, mouse, scanner, microphone, touch screens, interfaces for various medical devices, bar code readers, stylus, laser readers, radio-frequency device readers, etc. Furthermore, the I/O devices 20 may also include output devices, for example but not limited to, a printer, bar code printers, displays, etc. Finally, the I/O devices 20 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 12 is a PC, workstation, PDA, or the like, the software in the memory 18 may further include a basic input output system (BIOS) (not shown in FIG. 3). The BIOS is a set of software routines that initialize and test hardware at startup, start the O/S 24, and support the transfer of data among the hardware devices. The BIOS is stored in ROM so that the BIOS can be executed when the computer 12 is activated.

When the computer 12 is in operation, the processor 16 is configured to execute software stored within the memory 18, to communicate data to and from the memory 18, and to generally control operations of the computer 12 pursuant to the software. The control system 14 and the O/S 24, in whole or in part, but typically the latter, are read by the processor 16, perhaps buffered within the processor 16, and then executed.

When the control system 14 is implemented in software, as is shown in FIG. 3, it should be noted that the control system 14 can be stored on any computer readable medium for use by or in connection with any computer related system or method. In the context of this document, a "computer-readable medium" can be any means that can store, communicate, propagate, or transport the program for use by or in connection with the instruction execution system, apparatus, or device. The computer readable medium can be for example, but not limited to, an electronic, magnetic, optical, electro-magnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory. The control system 14 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In another embodiment, where the control system 14 is implemented in hardware, the control system 14 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 1:
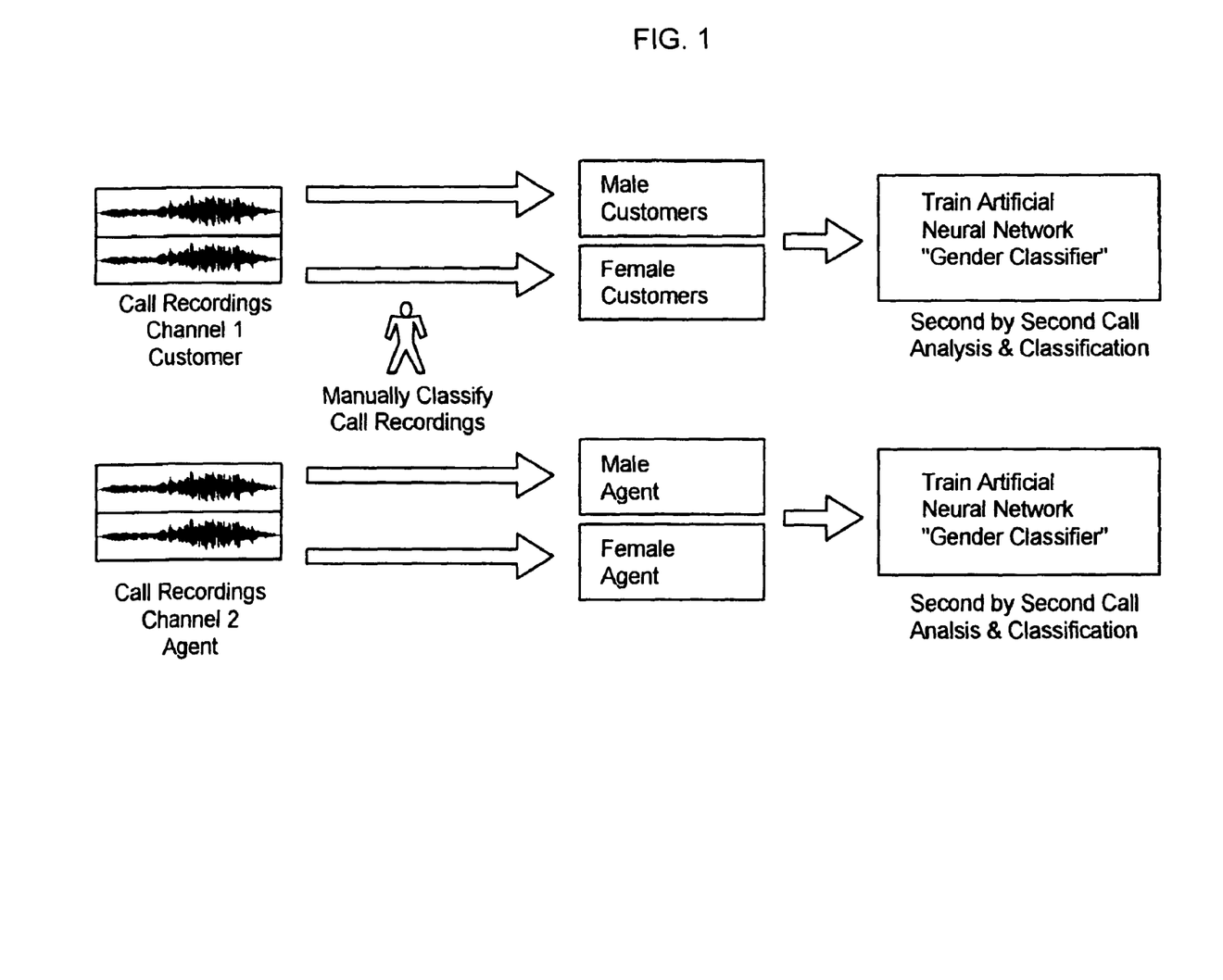
FIG. 1 is a flow chart of a method of determining the gender of a communicant in accordance with to the present invention.

Referring now to FIGS. 1-2, the computer program is first pre-configured by building a gender detection training model for gender detection. The training model will include an index of communications for which the associated gender has already been determined (i.e., the voice data has been determined to be male or female). As discussed below, a plurality of calls are separated into aggregated constituent voice data components. So, in the context of a contact center, the CSR's voice data is separated from caller voice data. Each of the aggregated constituent voice data components is then further separated into gender-related constituent voice data. Accordingly, in the context of a call center, the male CSR voice data is separated from the female CSR voice data, and the male caller voice data is separated from the female caller voice data.

The final separated voice data is then used to "train" the computer program by categorizing aural characteristics and respective frequencies associated with the characteristics of a male or female voice profile. The profiles can then be used as a gender detection model for subsequent analysis. Preferably, the generated gender detection model is stored in a database. However, it is contemplated that the model can be generated and used in real-time application to separate incoming communications and identify the gender of each communicant. It is also contemplated that the computer program can be configured to automatically update the stored profiles of the gender detection models based on newly received exemplar data. Accordingly, a dynamic gender detection model can be created and employed with the present invention.

After configuring the system using a training model as described above, the computer program is configured to receive at least one telephonic communication. Preferably, the telephonic communication is a recorded communication received from a recording database. However, it is also contemplated that analysis may be conducted in real-time on a telephonic communication. In such an instance, it will not be necessary to employ a separate recording database or the like. Instead, any subsequent analysis of the telephonic communication will be performed at the site of the present computer program.

Figure 5:
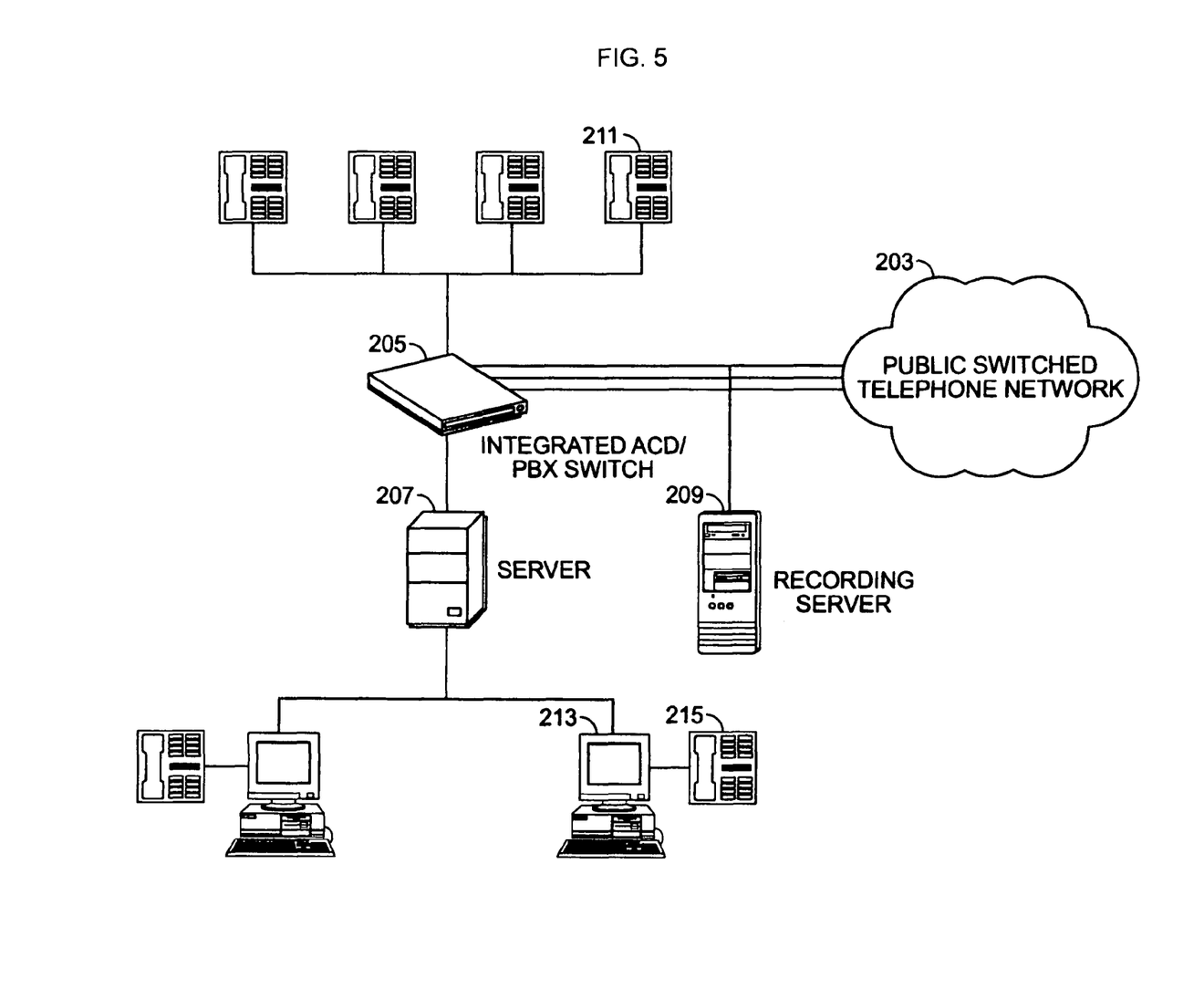
FIG. 5 is a block diagram of a telephonic communication system with a multi-port PSTN module according to the present invention.

As may be seen in FIG. 5, a telephonic communication may sent to a predetermined site such as, for example, a contact center directly through the public switched telephone network (PSTN) 203. Alternatively, the telephonic communication can be distributed through a private branch exchange (PBX), having a public switched telephone network (PSTN) 203 connected to the PBX through a PBX switch 205. The PBX switch 205 provides an interface between the PSTN 203 and a local network. Preferably, the interface is controlled by software stored on a telephony server 207 coupled to the PBX switch 205. The PBX switch 205, using interface software, connects trunk and line station interfaces of the public switch telephone network 203 to stations of a local network or other peripheral devices contemplated by one skilled in the art. Further, in another embodiment, the PBX switch may be integrated within a telephony server 207. The stations may include various types of communication devices connected to the network, including the telephony server 207, a recording server 209, telephone stations 211, and client personal computers 213 equipped with telephone stations 215.

According to the present invention, computer telephony integration ("CTI") technology is provided. In a preferred embodiment discussed herein, CTI resides on a telephony server 207. However, it will be understood by those skilled in the art that CTI can reside on its own server or at other hardware described herein. Generally, in terms of hardware architecture, the telephony server 207 includes a processor, memory, and one or more input and/or output (I/O) devices (or peripherals) that are communicatively coupled via a local interface. The processor can be any custom-made or commercially available processor, a central processing unit (CPU), an auxiliary processor among several processors associated with the telephony server 207, a semiconductor based microprocessor (in the form of a microchip or chip set), a macroprocessor, or generally any device for executing software instructions. The memory of the telephony server 207 can include any one or a combination of volatile memory elements (e.g., random access memory (RAM, such as DRAM, SRAM, SDRAM, etc.)) and nonvolatile memory elements (e.g., ROM, hard drive, tape, CDROM, etc.). The telephony server 207 may further include a keyboard and a mouse for control purposes, and an attached graphic monitor for observation of software operation. It will be understood that the telephony server may include standard CTI technology, such as that sold by Cisco, Avaya, Genesys or other provider of CTI providers.

According to one embodiment, the telephony server 207 also incorporates PBX control software to control the initiation and termination of connections between stations and via outside trunk connections to the PSTN 203. In addition, the software may monitor the status of all telephone stations 211 in real-time on the network and may be capable of responding to telephony events to provide traditional telephone service. This may include the control and generation of the conventional signaling tones such as dial tones, busy tones, ring back tones, as well as the connection and termination of media streams between telephones on the local network. Further, the PBX control software may use a multi-port module 223 and PCs to implement standard PBX functions such as the initiation and termination of telephone calls, either across the network or to outside trunk lines, the ability to put calls on hold, to transfer, park and pick up calls, to conference multiple callers, and to provide caller ID information.

Figure 6:
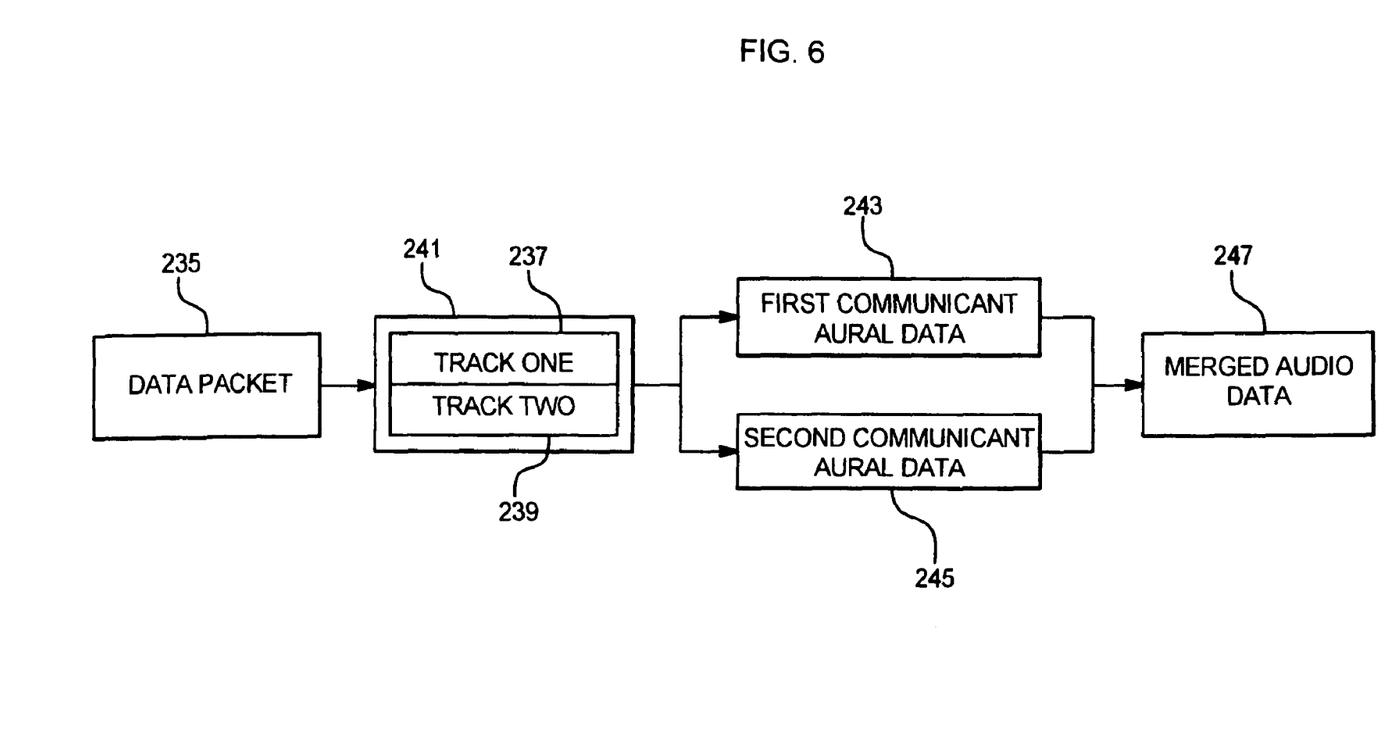
FIG. 6 is a block diagram of a computer used in connection with the present invention.

Referring to FIG. 6 in one embodiment, the telephony server 207 is equipped with multi-port PSTN module 223 having circuitry and software to implement a trunk interface 217 and a local network interface 219. The PSTN module 223 comprises a control processor 221 to manage the transmission and reception of network messages between the PBX switch 205 and the telephony server 207. The control processor 221 is also capable of directing network messages between the PBX switch 205, the local network interface 291, the telephony network server 207, and the trunk interface 217. In the one embodiment, the local network uses Transmission Control Protocol/Internet Protocol (TCP/IP), also known as Voice Over IP (VoIP). The network messages may contain computer data, telephony transmission supervision, signaling and various media streams, such as audio data and video data. The control processor 221 directs network messages containing computer data from the PBX switch 205 to the telephony network server 207 directly through the multi-port PSTN module 223.

The control processor 221 may include buffer storage and control logic to convert media streams from one format to another, if necessary, between the trunk interface 217 and local network. The trunk interface 217 provides interconnection with the trunk circuits of the PSTN 203. The local network interface 219 provides conventional software and circuitry to enable the telephony server 207 to access the local network. The buffer RAM and control logic implement efficient transfer of media streams between the trunk interface 217, the telephony server 207, the digital signal processor 225, and the local network interface 219.

The trunk interface 217 utilizes conventional telephony trunk transmission supervision and signaling protocols required to interface with the outside trunk circuits from the PSTN 203. The trunk lines carry various types of telephony signals such as transmission supervision and signaling, audio, fax, or modem data to provide plain old telephone service (POTS). In addition, the trunk lines may carry other communication formats such T1, ISDN or fiber service to provide telephony or multimedia data images, video, text or audio.

The control processor 221 manages real-time telephony event handling pertaining to the telephone trunk line interfaces, including managing the efficient use of digital signal processor resources for the detection of caller ID, DTMF, call progress and other conventional forms of signaling found on trunk lines. The control processor 221 also manages the generation of telephony tones for dialing and other purposes, and controls the connection state, impedance matching, and echo cancellation of individual trunk line interfaces on the multi-port PSTN module 223.

Preferably, conventional PBX signaling is utilized between trunk and station, or station and station, such that data is translated into network messages that convey information relating to real-time telephony events on the network, or instructions to the network adapters of the stations to generate the appropriate signals and behavior to support normal voice communication, or instructions to connect voice media streams using standard connections and signaling protocols. Network messages are sent from the control processor 221 to the telephony server 207 to notify the PBX software in the telephony server 207 of real-time telephony events on the attached trunk lines. Network messages are received from the PBX Switch 205 to implement telephone call supervision and may control the set-up and elimination of media streams for voice transmission.

The local network interface 219 includes conventional circuitry to interface with the local network. The specific circuitry is dependent on the signal protocol utilized in the local network. In one embodiment, the local network may be a local area network (LAN) utilizing IP telephony or VoIP. IP telephony integrates audio and video stream control with legacy telephony functions and may be supported through the H.323 protocol. H.323 is an International Telecommunication Union-Telecommunications protocol used to provide voice and video services over data networks. H.323 permits users to make point-to-point audio and video phone calls over a local area network. IP telephony systems can be integrated with the public telephone system through a local network interface 219, such as an IP/PBX-PSTN gateway, thereby allowing a user to place telephone calls from an enabled computer. For example, a call from an IP telephony client to a conventional telephone would be routed on the LAN to the IP/PBX-PSTN gateway. The IP/PBX-PSTN gateway translates H.323 protocol to conventional telephone protocol and routes the call over the conventional telephone network to its destination. Conversely, an incoming call from the PSTN 203 is routed to the IP/PBX-PSTN gateway and translates the conventional telephone protocol to H.323 protocol.

As noted above, PBX trunk control messages are transmitted from the telephony server 207 to the control processor 221 of the multi-port PSTN. In contrast, network messages containing media streams of digital representations of real-time voice are transmitted between the trunk interface 217 and local network interface 219 using the digital signal processor 225. The digital signal processor 225 may include buffer storage and control logic. Preferably, the buffer storage and control logic implement a first-in-first-out (FIFO) data buffering scheme for transmitting digital representations of voice audio between the local networks to the trunk interface 217. It is noted that the digital signal processor 225 may be integrated with the control processor 221 on a single microprocessor.

The digital signal processor 225 can include a coder/decoder (CODEC) connected to the control processor 221. The CODEC may be a type TCM29c13 integrated circuit made by Texas Instruments, Inc. In one embodiment, the digital signal processor 225 receives an analog or digital voice signal from a station within the network or from the trunk lines of the PSTN 203. The CODEC converts the analog voice signal into in a digital from, such as digital data packets. In an example with regard to a customer voice data packet 99, illustrated in FIG. 2, the data packet can be separated into aural segment data packet 101 and a non-aural segment data packet 102. The aural segment data packet 101 can include voice data corresponding to the frequency and amplitude of the communicant, as well as other voice data relating to speech. The non-aural data packet 102 can include non-speech related to the communication, such as the IP address of the caller, the telephone number of the caller, or the time the call was initiated. Other features of the non-aural data packet 101 are described in co-pending U.S. patent application Ser. No. 11/131,486 which is incorporated by reference herein.

It should be noted that the CODEC is not used when connection is made to digital lines and devices. From the CODEC, the digital data is transmitted to the digital signal processor 225 where telephone functions take place. The digital data is then passed to the control processor 221 which accumulates the data bytes from the digital signal processor 225. It is preferred that the data bytes are stored in a first-in-first-out (FIFO) memory buffer until there is sufficient data for one data packet to be sent according to the particular network protocol of the local network. The specific number of bytes transmitted per data packet depends on network latency requirements as selected by one of ordinary skill in the art. Once a data packet is created, the data packet is sent to the appropriate destination on the local network through the local network interface 219. Among other information, the data packet contains a source address, a destination address, and audio data. The source address identifies the location from which the audio data originated and the destination address identifies the location to which the audio data is to be sent.

The system permits bi-directional communication by implementing a return path allowing data from the local network, through the local network interface 219, to be sent to the PSTN 203 through the multi-line PSTN trunk interface 217. Data streams from the local network are received by the local network interface 219 and translated from the protocol utilized on the local network to the protocol utilized on the PSTN 203. The conversion of data may be performed as the inverse operation of the conversion described above relating to the IP/PBX-PSTN gateway. The data stream is restored in appropriate form suitable for transmission through to either a connected telephone 211, 215 or an interface trunk 217 of the PSTN module 223, or a digital interface such as a T1 line or ISDN. In addition, digital data may be converted to analog data for transmission over the PSTN 203.

Generally, the PBX switch of the present invention may be implemented with hardware or virtually. A hardware PBX has equipment located local to the user of the PBX system. The PBX switch 205 utilized may be a standard PBX manufactured by Avaya, Cisco, Siemens AG, NEC, Nortel, Toshiba, Fujitsu, Vodavi, Mitel, Ericsson, Panasonic, or InterTel. In contrast, a virtual PBX has equipment located at a central telephone service provider and delivers the PBX as a service over the PSTN 203.

As illustrated in FIG. 5 the system includes a recording server 209 for recording voice data associated with a customer communication. The recording server 209 may be connected to a port on the local network to the PSTN trunk line. The recording server 209 is also communicably coupled to the telephony server 207. The recording server 209 includes control system software, namely, recording software. The recording software can be implemented in software (e.g., firmware), hardware, or a combination thereof. In a currently contemplated preferred embodiment, the recording software is implemented in software, as an executable program, and is executed by one or more special or general purpose digital computer(s). The recording software may reside in, or have portions residing in any computer such as, but not limited to, a general purpose personal computer. While the recording server 209, is configured to store at least the voice data.

Generally, hardware architecture is the same as that discussed above and shown in FIG. 4. Specifically, the recording server 209 includes a processor, memory, and one or more input and/or output (I/O) devices (or peripherals) that are communicatively coupled via a local interface as previously described. The local interface can be, for example, but not limited to, one or more buses or other wired or wireless connections, as is known in the art. The local interface may have additional elements, which are omitted for simplicity, such as controllers, buffers (caches), drivers, repeaters, and receivers, to enable communications. Further, the local interface may include address, control, and/or data connections to enable appropriate communications among the other computer components.

Figure 7:
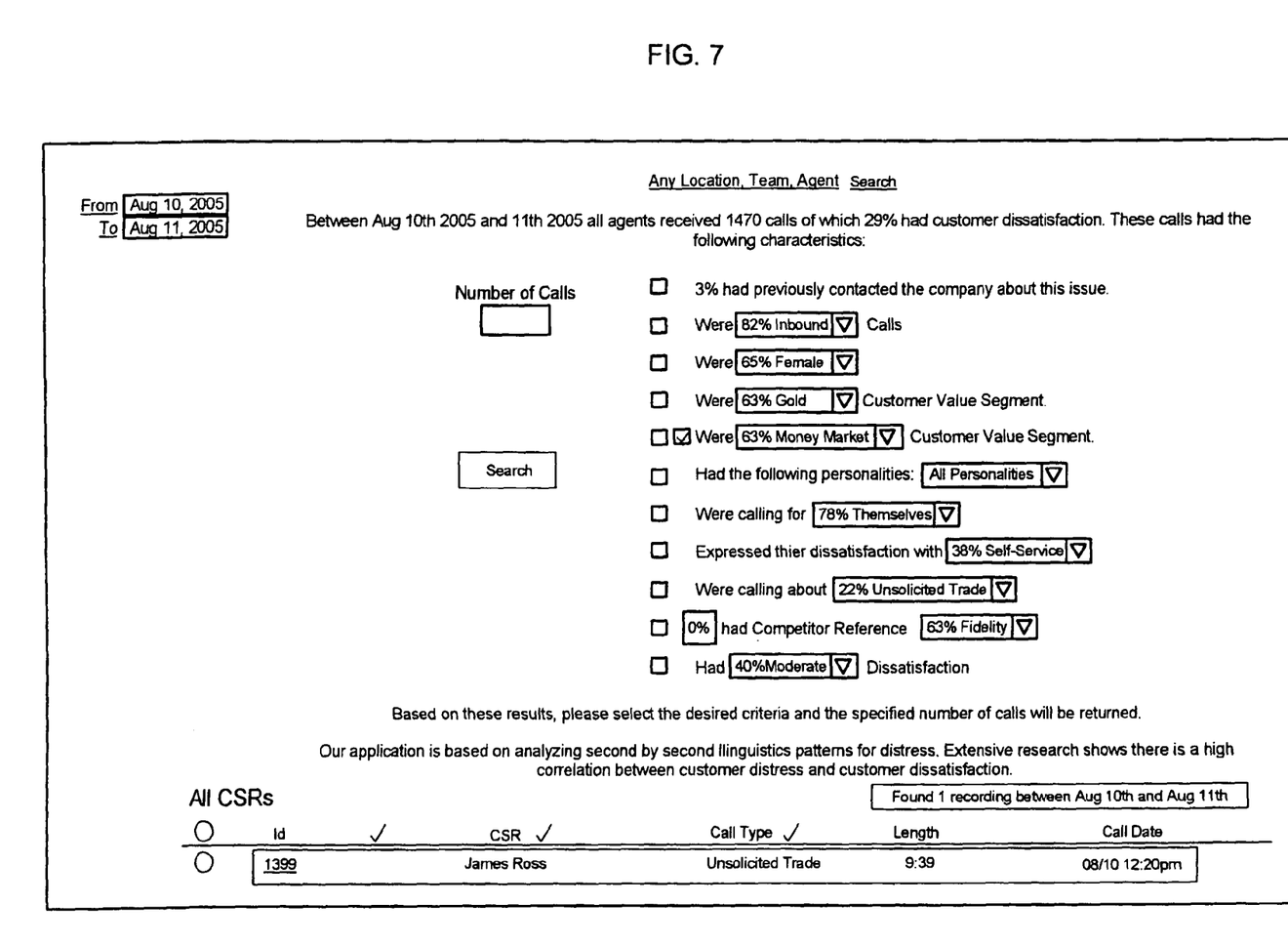
FIG. 7 is a flow chart illustrating the process of recording and separating a telephonic communication in accordance with the present invention.

Referring now to FIG. 7, the computer program of the present invention is configured to receive a separated telephonic communication (i.e., separated voice data). More particularly, the telephonic communication is separated into either or both of first constituent voice data and second constituent voice data. Preferably, the telephonic communication has a communication protocol, and the first constituent audio data is recorded on a first audio track of a data file based on the communication protocol. Similarly, the second constituent audio data is recorded on a second audio track of the data file based on the communication protocol.

In one preferred embodiment, the recording server 209 incorporates recording software for recording a telephone signal based on the source address and/or destination address of the signal. The method utilized by the recording server 209 depends on the communication protocol utilized on the communication lines to which the recording server 209 is coupled. The signal carrying audio data of a communication between at least two users can be an analog signal or a digital signal in the form of a network message. In one embodiment, the signal is an audio data transmitted according to a signaling protocol, for example the H.323 protocol described above.

One example of a recording method that may be used in the present system is illustrated in FIG. 7. In that embodiment, the telephonic communication is separated according to a method that minimizes audio distortion, increases fidelity, eliminates gain control and requires no additional filtering of the signal. Most preferably, the method for separation, recording and analysis of telephonic communications in the present invention will be of the type described in U.S. patent application Ser. No. 11/131,844 entitled METHOD AND SYSTEM FOR RECORDING AN ELECTRONIC COMMUNICATION AND EXTRACTING AUDIO DATA THEREFROM which is incorporated herein by reference.

Once the telephonic communication is received and separated, at least a portion of either, or both, of the first and second constituent voice data is analyzed. More particularly, the constituent voice data is analyzed by applying a gender detection model to at least a portion of constituent voice data.

In a preferred embodiment, as shown in FIG. 2, the computer is configured to identify one or more aural segments 101, 113 in the constituent voice data. Frame level data is then extracted from the identified aural segment 101, 113. More specifically, the identified aural segment 101, 113 is decomposed into one or more frames, each having a stationary aural signal. The decomposition of the frames generates at least one frequency. The generated frequency or frequencies can then be attenuated and converted to frequency domain. Once the frequency or frequencies have been converted, the computer program is configured to apply a non-linear filter to the attenuated generated frequency in the frequency domain. In this way the non-linear filter emphasizes at least one aural frequency. As described above, the computer is also configured to identify non-aural segments 102, 115, which include non-speech data.

According to one embodiment of the invention, the aural data packet 101, 113 is of sufficient length to identify the psycholinguistics of the aural data packet (i.e. the cognitive or behavioral characteristics of the speaker). In such an embodiment, the aural data packet 101, 113 can be readily analyzed to generate at least one aural data packet statistic 103, 117. Preferably, the aural data packet statistic is configured to identify the gender classification of the aural data packet 105, 119. For example, if the frequency is high relative to a predetermined baseline, the speaker may be determined to be female. Conversely, if the frequency is low as compared to the baseline, the speaker may be determined to be male. The number of aural data packets corresponding to a predetermined gender classification are then counted or otherwise assigned a value. The number of aural data packets 101, 113, or alternatively the assigned value, corresponding to a predetermined gender classification is compared to a predetermined threshold. Based on the comparison, the gender of the communicant can be determined.

Additionally, gender detection data can be generated. In one embodiment, the gender detection data is generated by identifying a plurality of the aural segments 101 wherein each aural segment 101 corresponds to at least one word spoken by a communicant. The identified aural segments 101 are decomposed into a plurality of respective frames. A respective frequency is generated for each of the identified and decomposed aural segments 101. The respective generated frequencies for each aural segment 101 are converted to domain. Then, a weighted neural model is applied to the frames, and the gender detection data is generated based on the application of the weighted neural model.

The generated gender detection data corresponds to the analyzed portion of the constituent voice data. Based on an analysis of at least the gender detection data, predictive customer behavioral data can be generated. Such predictive behavioral data can be used in assessing the overall success of the communication, as well as for identifying potential shortcomings in certain aspects of the operation of a contact center.

While the specific embodiments have been illustrated and described, numerous modifications come to mind without significantly departing from the spirit of the invention, and the scope of protection is only limited by the scope of the accompanying Claims.

What is claimed is:

1. A non-transitory computer readable medium adapted to control a computer and comprising a plurality of code segments for determining the gender of a communicant in a communication, the non-transitory computer readable medium comprising:
   a code segment for receiving a separated telephonic communication, the separated telephonic communication comprising at least one of first constituent voice data and second constituent voice data;
   a code segment for receiving an input transmission of a gender detection model, the code segment for generating a gender detection model comprising:
      a code segment for receiving predetermined male and female voice data; and,
      a code segment for identifying aural characteristics and frequencies associated with the received male and female voice data;
   a code segment for identifying at least one aural segment in at least one of the first and second constituent voice data,
   a code segment for analyzing at least a portion of one of the first and second constituent voice data by applying a gender detection model to the identified aural segment of the first and second constituent voice data;
   a code segment for generating gender detection data corresponding to the analyzed portion of one of the first and second constituent voice data, the gender detection data comprising at least an indicator of the gender of the communicant of the analyzed portion of one of the first and second constituent voice data;
   a code segment for extracting frame level data from the identified aural segment;
   a code segment for generating an aural data packet having at least one frame, wherein the aural data packet is of a length such that psycholinguistics of the aural data packet is capable of being identified; and,
   a code segment for analyzing the aural data packet to generate at least one aural data packet statistic.

2. The non-transitory computer readable medium of claim 1 further comprising a code segment for separating the telephonic communication into at least the first constituent voice data and the second constituent voice data.

3. The non-transitory computer readable medium of claim 2, wherein the communication has a communication protocol, and wherein the code segment for separating the telephonic communication into at least the first constituent voice data and the second constituent voice data further comprises:
    a code segment for recording the first constituent audio data on a first audio track of a data file based on the communication protocol; and,
    a code segment for recording the second constituent audio data on a second audio track of the data file based on the communication protocol.

4. The non-transitory computer readable medium of claim 1, wherein the code segment for extracting the frame level data further comprises:
    a code segment for decomposing the identified aural segment into at least one frame having a stationary aural signal wherein the decomposing generates at least one frequency;
    a code segment for attenuating at least one generated frequency;
    a code segment converting the attenuated generated frequency to frequency domain; and,
    a code segment for applying a non-linear filter to the attenuated generated frequency in the frequency domain such that the non-linear filter emphasizes at least one aural frequency.

5. The non-transitory computer readable medium of claim 1, wherein the aural data packet statistic is configured to identify the gender classification of the aural data packet.

6. The non-transitory computer readable medium of claim 5 further comprising:
    a code segment for analyzing a plurality of the aural data packets, wherein each aural data packet comprises an aural data packet statistic identifying the gender classification of the respective aural data packet;
    a code segment for counting the number of aural data packets corresponding to a predetermined gender classification;
    a code segment for comparing the number of aural data packets corresponding to a predetermined gender classification to a predetermined threshold; and,
    a code segment for identifying the gender of the communicant based on the comparison.

7. The non-transitory computer readable medium of claim 1 further comprises a code segment for generating predictive customer behavioral data based on an analysis of at least the gender detection data.

8. The non-transitory computer readable medium of claim 1 further comprising:
    a code segment for identifying a plurality of the aural segments wherein each aural segment corresponds to at least one word spoken by a communicant;
    a code segment for decomposing the plurality of identified aural segments into a plurality of respective frames;
    a code segment for generating a respective frequency for each of the plurality of identified and decomposed aural segments;
    a code segment for converting each respective generated frequency for each aural segment to frequency domain; and,
    a code segment for applying a weighted neural model to the plurality of frames wherein the gender detection data is generated based on the applying of the weighted neural model.

9. The non-transitory computer readable medium of claim 1 further comprising a code segment for generating predictive behavioral data corresponding to the communicant based on the applying of the gender detection model.

10. A non-transitory computer readable medium adapted to control a computer and comprising a plurality of code segments for determining the gender of a communicant in a communication, the non-transitory computer readable medium comprising:
    a code segment for receiving a separated telephonic communication, the separated telephonic communication comprising at least one of first constituent voice data and second constituent voice data;
    a code segment for analyzing at least a portion of one of the first and second constituent voice data by applying a gender detection model to at least a portion of one of the first and second constituent voice data;
    a code segment for generating gender detection data corresponding to the analyzed portion of one of the first and second constituent voice data, the gender detection data comprising at least an indicator of the gender of the communicant of the analyzed portion of one of the first and second constituent voice data;
    a code segment for generating an aural data packet having at least one frame, wherein the aural data packet is of a length such that psycholinguistics of the aural data packet is capable of being identified; and,
    a code segment for analyzing the aural data packet to generate at least one aural data packet statistic.

* * * * *